United States Patent
Joo

(10) Patent No.: US 6,678,373 B1
(45) Date of Patent: Jan. 13, 2004

(54) SHORTCUT DIALING APPARATUS FOR TELEPHONE SET

(76) Inventor: Won-Il Joo, Podomaul Apt. 805-902, 1171, Joong-Dong, Weonmi-Ku, Bucheon, Kyeongki-Do, 420-020 (KR)

( * ) Notice: Subject to any disclaimer, the term of this patent is extended or adjusted under 35 U.S.C. 154(b) by 0 days.

(21) Appl. No.: 09/646,595
(22) PCT Filed: Mar. 20, 1999
(86) PCT No.: PCT/KR99/00124
§ 371 (c)(1),
(2), (4) Date: Sep. 19, 2000
(87) PCT Pub. No.: WO99/49641
PCT Pub. Date: Sep. 30, 1999

(30) Foreign Application Priority Data

Mar. 20, 1998 (KR) .............................................. 98/4196
Mar. 17, 1999 (KR) .............................................. 99/4250

(51) Int. Cl.[7] .............................................. H04M 1/00
(52) U.S. Cl. .............................. 379/355.02; 379/355.05; 379/356.01; 379/357.01
(58) Field of Search ....................... 379/355.01, 355.02, 379/355.03, 355.05, 355.09, 356.01, 357.01, 357.02; 455/564, 565

(56) References Cited

U.S. PATENT DOCUMENTS 5,946,635 A * 8/1999 Diminguez ................. 455/558

FOREIGN PATENT DOCUMENTS

EP  0318454  5/1989
EP  0618711  10/1994

* cited by examiner

Primary Examiner—Rexford Barnie
(74) Attorney, Agent, or Firm—Ostrolenk, Faber, Gerb & Soffen, LLP

(57) ABSTRACT

A shortcut dialing apparatus for a telephone set is disclosed. The apparatus includes a plurality of ROMs for storing telephone numbers therein, a plurality of ROM cards including a corresponding ROM among the ROMs and electrically and detachably being engaged with a main body, a ROM card receiving unit formed in the main body for receiving the ROM card therein, a plurality of selection switches for selectively outputting the telephone number stored in the ROMs, a CPU for scanning the selection switch pushed by a user among the selection switches and outputting a data corresponding to the telephone number stored in the ROM, a DTMF signal generator for outputting a DTMF signal corresponding to the data, and a speaker for receiving the DTMF signal and outputting a sound for thereby detachably installing a ROM card with a ROM into a main body, storing a plurality of telephone numbers into the ROM, and transmitting a corresponding telephone number based on a one-touch operation of the button.

22 Claims, 6 Drawing Sheets

SHORTCUT DIALING APPARATUS FOR TELEPHONE SET

TECHNICAL FIELD

The present invention relates a shortcut dialing apparatus for a telephone set, and in particular to a shortcut dialing apparatus for a telephone set which is capable of storing a telephone number into a detachable ROM card, and reading the thusly stored telephone number from the ROM card in which the telephone number is stored based on a one-touch operation.

BACKGROUND ART

As the number of telephone numbers that people should memory is increased, since it is difficult to correctly memory the telephone numbers, a person writes down the number on paper. When dialing the telephone set, the person dials with his/her one hand holding the paper on which the telephone number is written for thereby causing much inconveniences for using the telephone set.

In order to overcome the above-described problems, a telephone set with a shortcut dialing function is disclosed. This telephone set is capable of implementing a dialing operation based on a one-touch method without pushing a plurality of numbers. In order to implement the above-described short-cut dialing operation, a memory unit is installed in a telephone set main body for thereby storing the telephone numbers. When a user pushes a predetermined button, the storing mode is set. Thereafter, the user pushes corresponding numbers, and then the storing completion button is pushed for thereby completing a telephone number storing operation. In this state, when the user pushes a corresponding shortcut button, the telephone number corresponding to the shortcut button is transmitted for thereby implementing a desired communication.

The conventional shortcut dialing function is directed to implement a communication by pushing a corresponding button at one time without memorizing a plurality of numbers. However, in this function, it is difficult to use.

Namely, the button operation sequences are different for using the shortcut function based on the fabrication companies. In order to transmit the previously stored telephone numbers, it is difficult to know how to operate the shortcut buttons. For example, assuming that a user stores the telephone number of a restaurant as 1, the telephone number of a door-to-door delivery service company as 2, the telephone number of a business partner as 3, and the telephone number of a friend as 4, the user pushes a selection button for using the shortcut dialing function in order to call the business partner, and then pushes the button 3 which is designated as the telephone number of the business partner company, the telephone number of the business partner is transmitted. At this time, the user may forget the button which corresponds to the business partner. In order to prevent the above-described problem, the user should write down the shortcut telephone number on the paper. In this case, the earlier described conventional problems occur. Namely, the number of the shortcut telephone numbers is increased, it is very difficult for the user to memory the shortcut telephone numbers.

In addition, in order to overcome the above-described problems, a telephone service technique is disclosed for the shortcut dialing function. For example, a plurality of telephone numbers are stored, and then the shortcut dialing apparatus is distributed to the users. The user connects the shortcut dialing apparatus to the telephone set using a wire, and then the user pushes a corresponding shortcut button for thereby transmitting a corresponding telephone number related to the shortcut button. However, since the shortcut dialing apparatus has a limited number of the telephone numbers stored, it is impossible to use it for a large scale company. In addition, since it is impossible to store the telephone numbers that a user wishes to store, the shortcut dialing apparatus may not be used for a personal use. Furthermore, the purpose of the use of the same is limited. In this case, the user should be charged of the rate of the telephone services.

DISCLOSURE OF THE INVENTION

Accordingly, it is an object of the present invention to provide a shortcut dialing apparatus for a telephone set which overcomes the aforementioned problems encountered in the background art.

It is another object of the present invention to provide a shortcut dialing apparatus for a telephone set which is capable of detachably installing a ROM card with a ROM, in which telephone numbers are stored, into a main body for thereby transmitting a telephone number stored in the ROM.

It is another object of the present invention to provide a shortcut dialing apparatus for a telephone set which is capable of detachably installing a ROM card with a ROM into a main boy, storing a plurality of telephone numbers into the ROM, and transmitting a corresponding telephone number based on a one-touch operation of the button.

In order to achieve the above objects, there is a provided a shortcut dialing apparatus for a telephone which includes a plurality of ROMs for storing telephone numbers therein, a plurality of ROM cards including a corresponding ROM among the ROMs and electrically and detachably being engaged with a main body, a ROM card receiving unit formed in the main body for receiving the ROM card therein, a plurality of selection switches for selectively outputting the telephone number stored in the ROMs, a CPU for scanning the selection switches pushed by a user among the selection switches and outputting a data corresponding to the telephone number stored in the ROM, a DTMF signal generator for outputting a DTMF signal corresponding to the data, and a speaker for receiving the DTMF signal and outputting a sound.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

MODES FOR CARRYING OUT THE INVENTION

Figure 1:
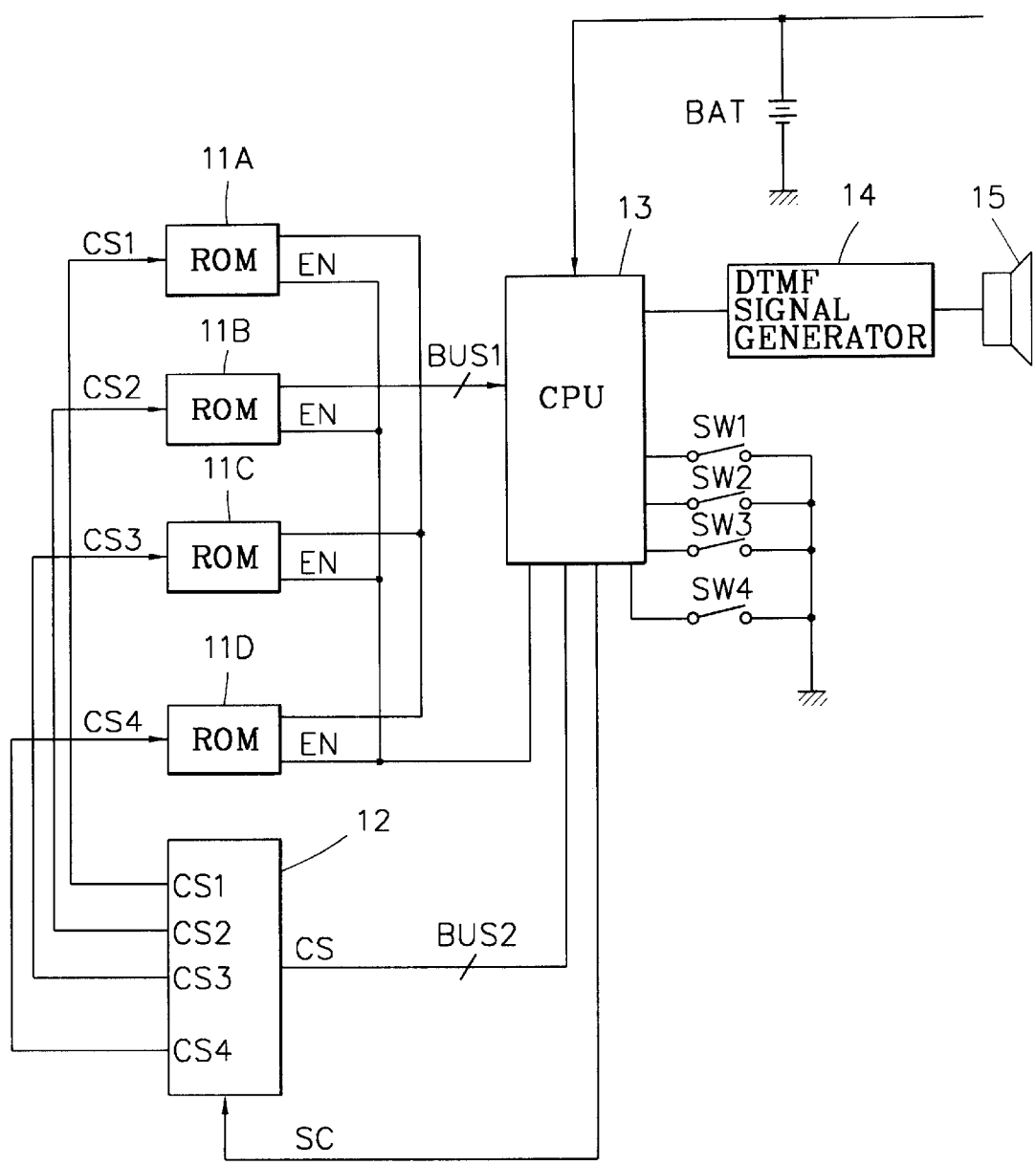
FIG. 1 is a block diagram illustrating a shortcut dialing apparatus for a telephone set according to a first embodiment of the present invention.

FIG. 1 is a block diagram illustrating a shortcut dialing apparatus according to a first embodiment of the present invention which includes ROMs 11A through 11D for storing a plurality of telephone numbers and outputting a corresponding telephone number when a user selects the same, a demultiplexer 12 for selectively supplying chip selection signals CS1 through CS4 to a corresponding ROM in order to read a telephone number from the ROM selected among the ROMs 11A through 11D by the user, selection switches SW1 through SW4 for selectively outputting a telephone number selected by the user among the telephone numbers stored in the ROMs 11A through 11D, a CPU 13 for scanning a button pushed by the user among the selection switches SW1 through SW4, supplying the chip selection signal CS to the demultiplexer 12 in order to output a telephone number stored in a corresponding ROM among the ROMs 11A through 11D, and transferring the outputted telephone number to a DTMF signal generator 14, a DTMF signal generator 14 for converting the telephone number from the CPU 13 into the DTMF signal and amplifying the thusly converted signal to a predetermined level, and a speaker 15 for transferring the DTMF signals sequentially outputted from the DTMF signal generator 14 to the handset side of the telephone set.

Figure 2:
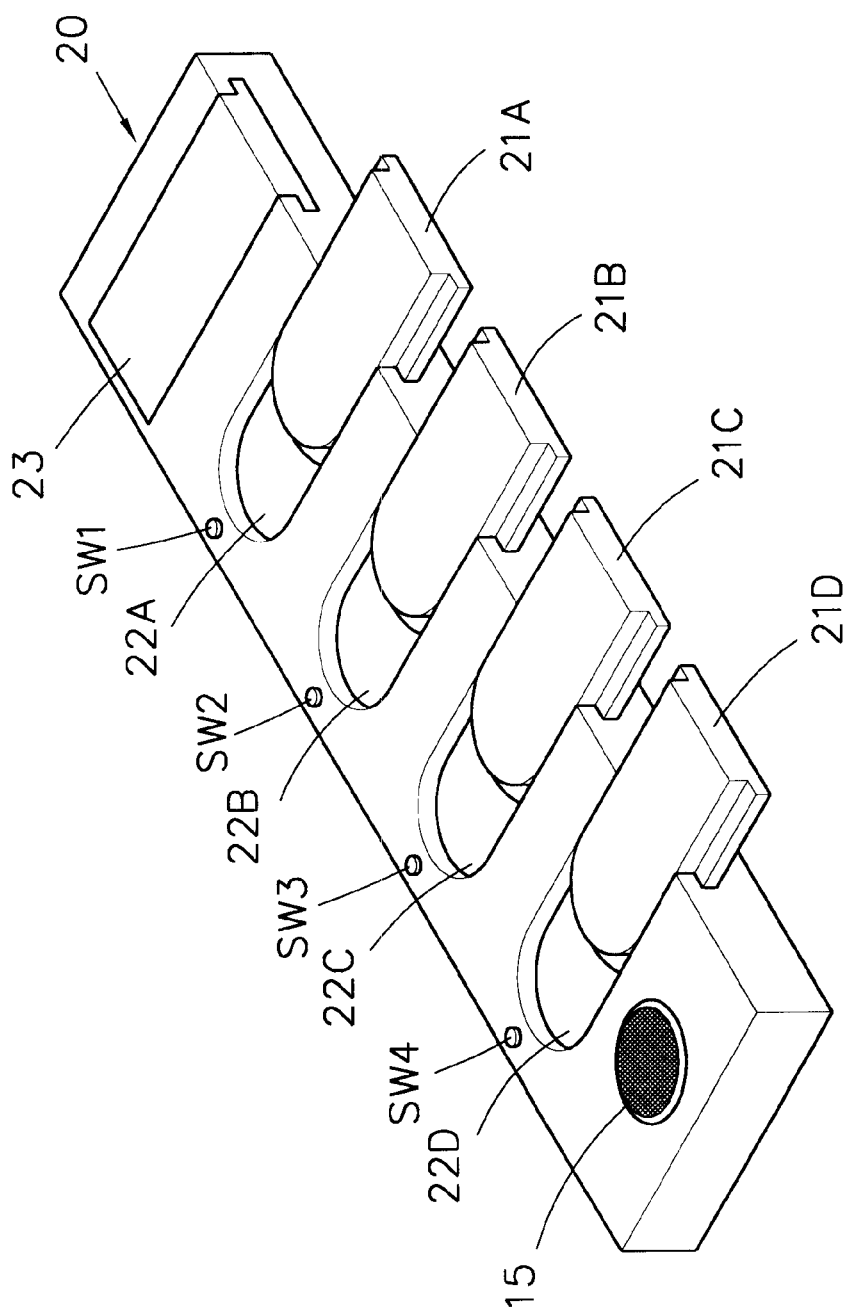
FIG. 2 is a view illustrating a shortcut dialing apparatus according to the present invention.

FIG. 2 is a view illustrating the shortcut dialing apparatus according to the present invention. The ROMs 11A through 11D are detachably installed in the ROM cards 21A through 21D. A plurality of ROM card receiving units 22A through 22D are installed into the main body 20 for slidably installing the ROM cards 21A through 21D. A groove is formed in each of the ROM card receiving units 22A through 22D. The selection switches SW1 through SW4 are installed at the portions corresponding to the ROM cards for selecting a corresponding ROM card in which the telephone number is stored. In addition, The ROM cards 21A through 21D are formed in a thin card shape for a slidable installation. A groove is formed at each of the ROM card receiving units 22A through. 22D for receiving a thin card-shaped ROM card thereinto.

Figure 3:
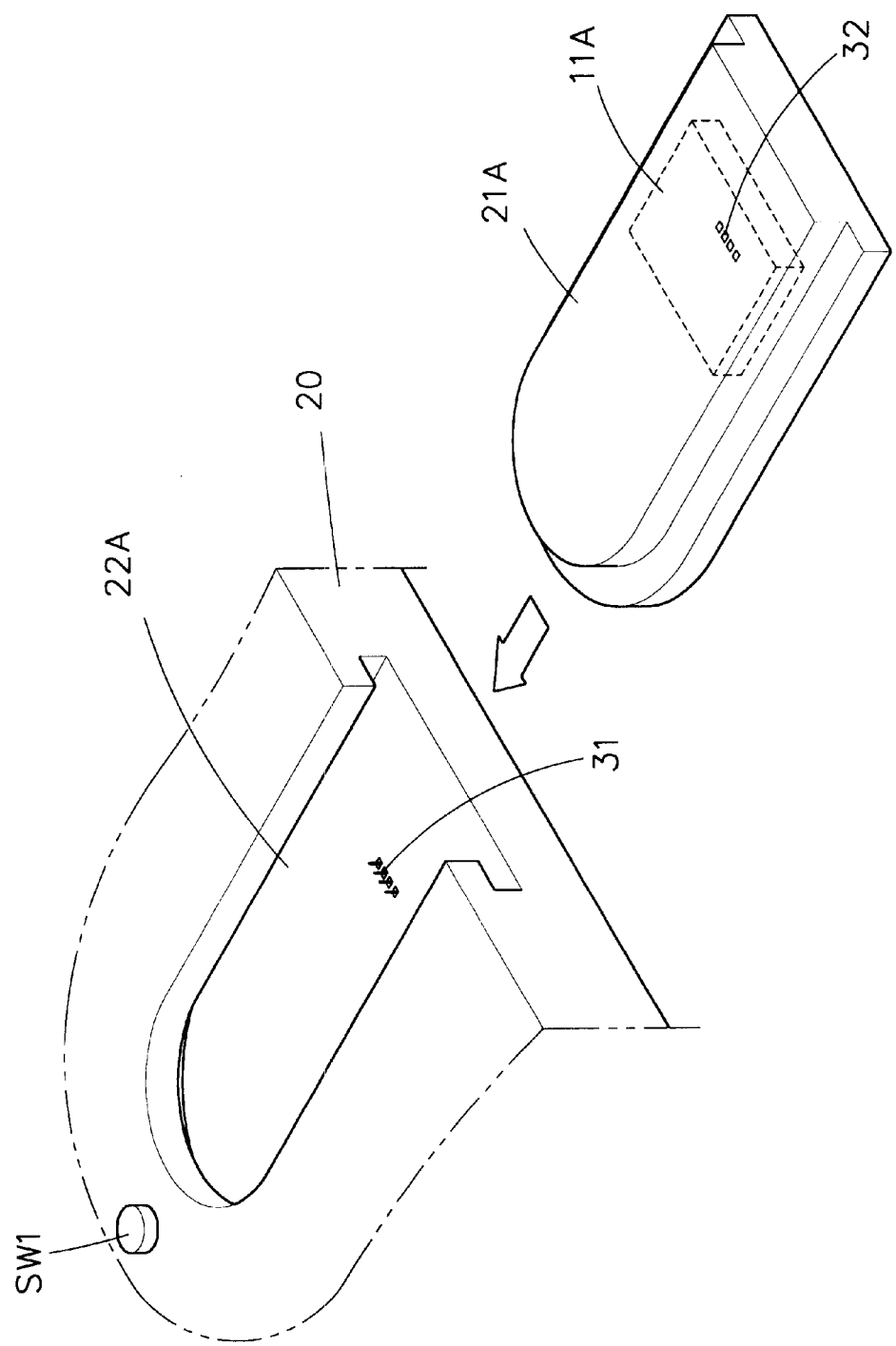
FIG. 3 is a view illustrating a ROM card and a ROM card receiving unit of FIG. 2 according to the present invention.

FIG. 3 is a view illustrating a ROM card and a ROM card receiving unit of FIG. 2 according to the present invention. As shown therein, a plurality of contact pins 31 are elastically engaged with the ROM card receiving units 22A through 22D. The contact pin 31 is exposed at a portion corresponding with the input/output terminal 32 of the ROM and is elastically connected with the input/output terminal 32 of the ROM when the ROM cards 21A through 21D are received in the ROM card receiving units 22A through 22D for thereby forming a circuit as shown in FIG. 1.

In addition, a predetermined information may be written on the surface of the ROM cards 21A through 21D, so that the user writes down a predetermined information such as the telephone numbers of a supermarket, a restaurant, hospital, company, etc. thereon for thereby easily checking a corresponding ROM card in which a telephone number that the user wishes to know is stored. The ROM card with the telephone numbers may be stored in the ROM card receiving box 23 or may be stored at a predetermined location.

The operation of the shortcut dialing apparatus according to the present invention will be explained.

When a user inserts the ROM card containing a predetermined telephone number from the ROM card receiving box 23 or a predetermined position into the ROM card receiving units 22A through 22D, the contact pin 31 and the input/output terminal 32 of the ROM elastically contact, so that the ROMs 11A through 11D installed in the ROM card form an electrical connection as shown in FIG. 1.

In this state, when the user contacts the handset of the telephone with the speaker 15, and pushes a predetermined switch among the selection switches SW1 through SW4, a predetermined voice corresponding to the telephone number stored in the selected ROM is transferred to the telephone through the handset, so that a corresponding telephone number is automatically transmitted from the telephone set to the switch unit.

For example, assuming that a restaurant telephone number is stored in the ROM 11A of the ROM card 21A, and a user wishes to call the restaurant, the handset of the telephone set is contacted with the speaker 15, and the selection switch SW1 installed near the ROM card 21A is pushed.

At this time, the CPU 13 scans that the selection switch SW1 is turned on, and outputs a read enable signal EN to the ROMs 11A through 11D for reading the telephone number of the restaurant stored in the ROM 11A of the ROM card 21A and outputs a switching control signal SC and a chip selection signal CS through the bus BUS2. The demultiplexer selected a chip selection signal CS1 by the switching control signal SC and outputs the selected chip selection signal CS1 to the ROM 11A.

The ROM 11A is selected among the ROMs 11A through 11D, and the data corresponding to the telephone number of the restaurant stored in the ROM 11A is read and then is outputted to the CPU 13 through the data bus BUS1.

The CPU 13 outputs the data to the DTMF signal generator 14, and the DTMF signal generator 14 outputs a DTMF signal based on the inputted data, and then the signal is transmitted to the switch unit through the handset of the telephone set and the telephone line.

Therefore, the user can implement a communication by calling the restaurant by pushing the switch at one time without pushing a predetermined number of the telephone numbers of the restaurant.

In the above-described embodiment of the present invention, the case that four ROM cards 21A through 21D are installed. The number of the ROM cards is not limited thereto. In addition, the main body 20 may be formed in a predetermined shape. In the above description, the function for selecting the ROMs 11A through 11D is performed by the demultiplexer 12, and the DTMF signal is generated by the DTMF signal generator 14. However, the functions of the demultiplexer 12 and the DTMF signal generator 14 may be performed by the CPU 13.

The second embodiment of the present invention will be explained.

Figure 4:
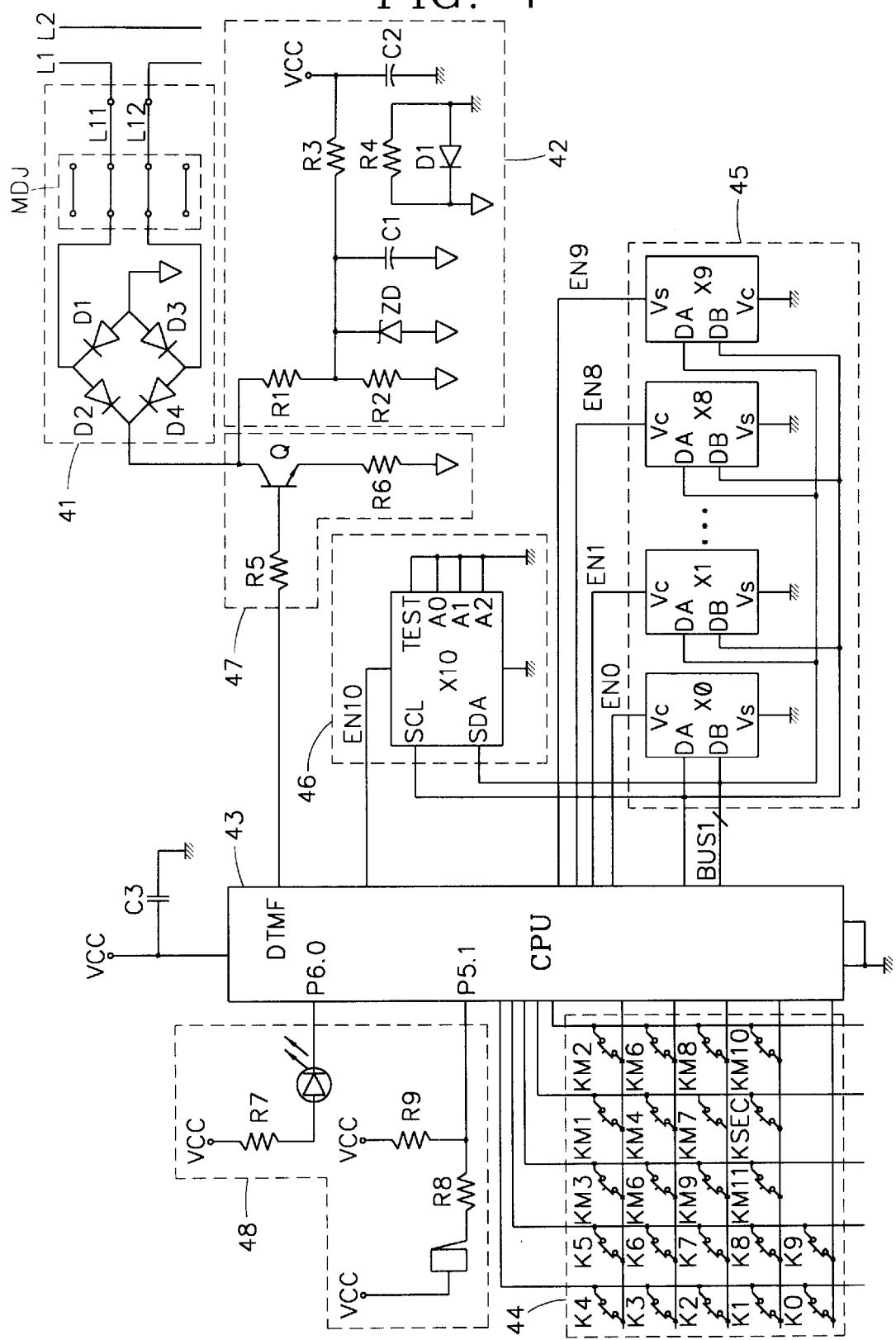
FIG. 4 is a circuit diagram illustrating a shortcut dialing apparatus for a telephone set according to a second embodiment of the present invention.

FIG. 4 is a block diagram illustrating the shortcut dialing apparatus according to the present invention. As shown therein, the connection unit 41 includes a modular jack MDJ and bridge diodes D1 through D4, and the modular jack MDJ connects the apparatus with the local lines L1 and L2. In addition, the telephone set connected with the local lines L1 and L2 are not shown in the drawing. When a hook switch of the telephone set is enabled, the local line voltage is inputted through the modular jack(MDJ). The constant voltage generator 42 includes first and second resistors R1 and R2 which divide the local line voltage, and a zener diode ZD and condensers C1 and C2 connected in parallel with the second resistor R2 for generating a constant voltage. The local line voltage is divided by the first and second resistors R1 and R2 through the bridge diode D2. The voltage applied to the second resistor R2 through is converted into the constant voltage by the zener diode ZD, and two condensers C1 and C2 and is used as a power source VCC for driving the apparatus according to then present invention. In addition, the local line voltage is used as a power for driving the telephone set since the power source VCC is small in proportion to the size of the local line voltage, the voltage does not affect the driving power of the telephone set.

The CPU 43 is driven by the power source VCC and controls each element. The switch matrix 44 is connected with the CPU 43 and generates a predetermine signal in accordance with the switch operation by the user. The switches K0 through K9 are the number switches for inputting the telephone numbers when storing the telephone numbers and performing a shortcut dialing function when transmitting the stored telephone number. The switch KSEC is a setting/completion switch for setting the system to the storing mode or the transmission mode. The remaining switches KM1 through KM11 are the shortcut switches for performing a shortcut dial function.

The first memory unit 45 includes a plurality of ROMs X0 through X9, and each of the ROMs X0 through X9 is capable of storing the data therein corresponding to the telephone number and includes four terminals VC, VS, DA and DB for implementing an electrical connection with the CPU 43. The terminal VC is the terminal for receiving the enable signal from the CPU 43, and the terminal VS is connected with the ground, and the terminals DA and DB are used for a serial communication with the CPU and are connected with the CPU 43 through the serial communication bus BUS1. Four terminals VC, VS, DA and DB are used for implementing the detachable installations of the ROMs X0 through X9.

When the enable signals EN0 through EN9 are inputted from the CPU 43, the enabled ROMs X0 through X9 output the data corresponding to the telephone numbers installed in the interior, and the thusly outputted data are transferred to the CPU through the terminals DA and DB and the serial communication bus BUS1. In addition, the 10th ROM X9 among ten ROMs X0 through X9 stores the data in accordance with an enable signal EN9 from the CPU 43, and the remaining ROMs X0 through X8 output the previously stored data.

Namely, nine ROMs among ten ROMs read the data, and the remaining one ROM reads/writes the data for the reason that the use can easily use the system. In addition, the ROM is EEPROM which is capable of reading and writing the data.

The second memory unit 46 includes one ROM X10, and a plurality of telephone numbers are stored in the ROM X10. When fabricating the apparatus according to the present invention, the telephone numbers, for example 10 telephone numbers, are stored therein for thereby implementing a read/write operation of the telephone numbers by the switch KSEC.

When the user pushes the shortcut switches KM1 through KM11, the CPU 43 outputs an enable signal EN10, and one telephone number is selected among 11 telephone numbers stored in the ROM X10, and the data corresponding to the telephone number is transferred to the CPU 43 through the serial communication bus BUS1.

The DTMF driving unit 47 outputs a DTMF signal when the CPU 43 outputs a voltage to the DTMF terminal and includes a switching transistor Q, a resistor R6 between the DTMF terminal of the CPU 43 and the switching transistor Q, and a resistor R7 between the emitter of the switching transistor Q and the ground.

The ground of the bridge diodes D1 through D4 of the connection unit 31, the resistor R2 of the constant voltage generator 42, and the zener diode ZD, and the condenser C1, and the ground of the resistor R7 of the DTMF driving unit 47 are connected. In addition, in order to prevent the DTMF signal from the resistor R7 from being dropped below the level 0, the resistor R4 and the diode D1 are connected in parallel between the ground connected with the resistor R7 and another ground for thereby implementing an increased stable level of the DTMF signal.

The display unit 48 includes a LED connected between the power source VCC and the CPU 43 for emitting light in accordance with a switch operation of the user, and a buzzer BUZZ connected between the power source VCC and the CPU 43 for generating a sound in accordance with a switch operation of the user.

Figure 5:
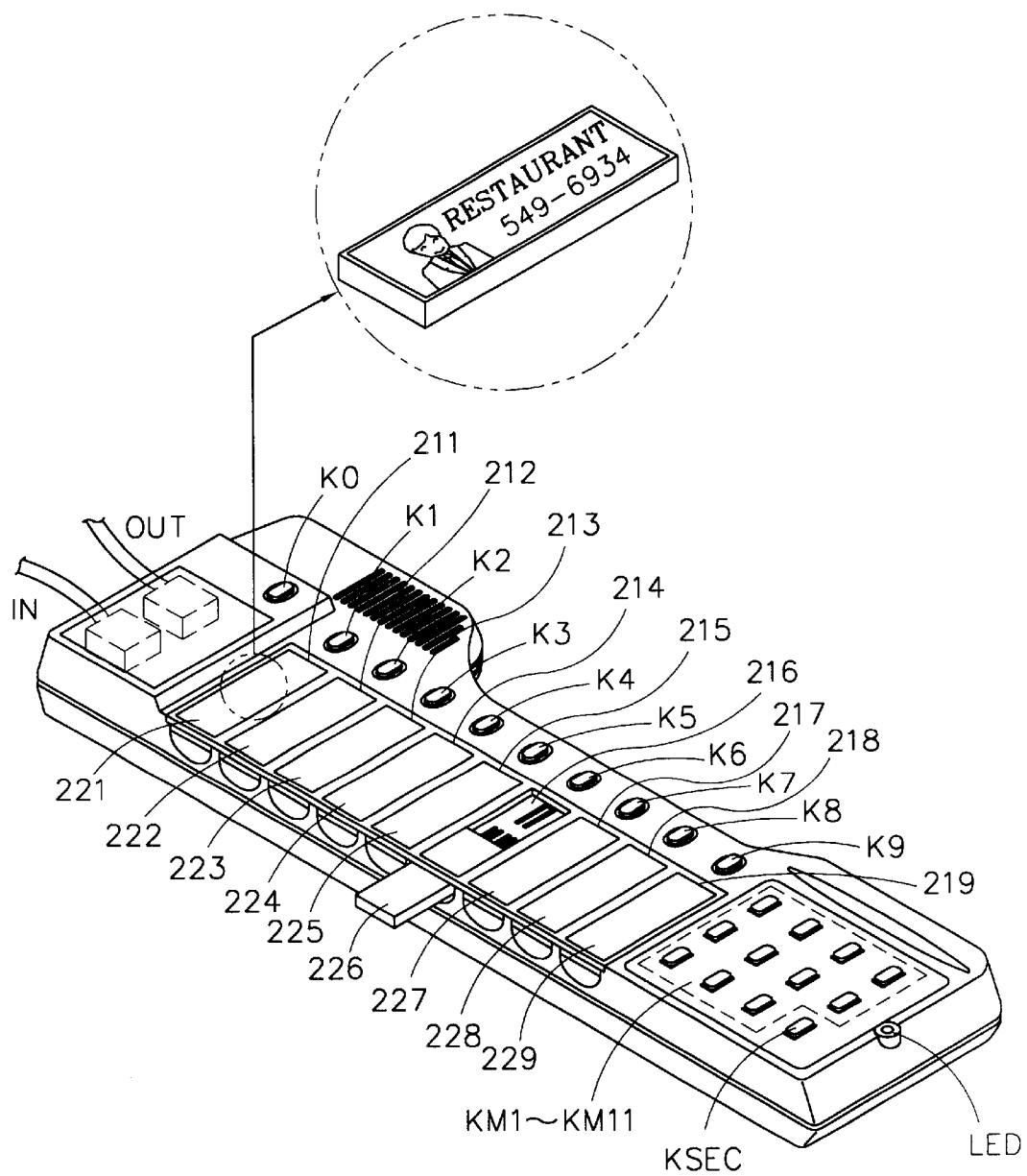
FIG. 5 is a perspective view illustrating a shortcut dialing apparatus for a telephone set according to a second embodiment of the present invention.

FIG. 5 is a perspective view illustrating the shortcut dialing apparatus according to the second embodiment of the present invention. As shown therein, a modular jack MDJ is installed at the upper portion of the main body 20, and the input terminal IN is connected with the local line from the switch unit, and the output terminal OUT is connected with the telephone set. A plurality of shortcut switches KM1 through KM11 and a setting/completion switch MSEC are installed at a lower portion of the upper panel of the main body 20. A plurality of ROM card receiving units 210 through 219 are installed on the upper surface of the main body 20, and a plurality of ROM cards 220 through 229 are slidably received into the ROM card receiving units 210 through 219. The ROMs X0 through X9 are installed in the ROM cards 220 through 229. The number switches K0 through K9 are installed beside the ROM card receiving units 210 through 219. The LED is installed at a lower portion of the upper surface of the main body 20.

A plurality of contact pins are formed in the ROM card receiving units 210 through 219 in the same manner as the method of the first embodiment of the present invention. In a state that the ROM cards 220 through 229 are inserted into the ROM card receiving units 210 through 219, four terminals VC, CS, DA and DB of the ROMs X0 through X9 of FIG. 4 contact with the contact pins for thereby implementing an electrical contact between the ROMs X0 through X9 and the CPU.

Next, the operation of the second embodiment of the present invention will be explained based on the switch operation of the user.

The operation will be explained based on the following operations. Namely, the operation for inputting the telephone numbers into the ROMs X0 through X9 and the operations for transmitting the stored telephone numbers in the state that the telephone numbers are stored in the ROMs X0 through X9.

[Telephone number storing operation]

When the user picks up the handset, the local power is inputted into the modular jack MDJ of the connection unit 41 through the local lines L1 and L2. The local line power is divided by the resistors R1 and R2 of the constant voltage generation unit 42, and the thusly divided voltage drives the CPU 43.

When the setting/completion switch KSEC is pushed by the user, the CPU 43 outputs a read enable signal, and the read enable signal EN9 is applied to the 10th ROM X9 through the 10th terminal VC. The 10th ROM X9 is write-enabled. The CPU 43 changes the voltage level of the terminal P6.0 for thereby turning on/off the LED. Therefore, the user recognizes that it is ready to store the telephone numbers. The 10th ROM X9 is enabled for the reason that the telephone number is stored into the ROM X9 corresponding to the ROM card 229 inserted into the lowest receiving unit 219 among 10 ROM card receiving units 210 through 219 of FIG. 5 for uniformly arranging the enabled states of the ROMs into which the telephone numbers are stored for thereby preventing any confusion when the user uses the apparatus.

When the user sequentially pushes the switches corresponding to the telephone numbers among 10 number switches K0 through K9, and pushes the setting/completion switch KSEC, the CPU 43 outputs the data corresponding to the number switches K0 through K9, and the thusly outputted data is stored into the 10th ROM X9 enabled via the serial communication bus BUS1. At this time, the CPU turns off the LED, changes the voltage level of the terminal P5.1 and causes the BUZZ to output a sound, so that the user can recognize that the storing operation of the telephone number is completed.

The user can write the information such as the telephone number, the name of the business partner, the name of a person, the name of the company, etc. on the upper surface of the ROM card. Therefore, it is possible to correctly confirm the telephone number of a corresponding person or company.

[Telephone number transmission]

The user inserts the ROM cards 220 through 229 having the ROMs X0 through X9 therein into the ROM card receiving units 210 through 219. For example, the ROM card having the telephone number that the user wishes to call is inserted into the second ROM card receiving unit 211, and then the user picks up the handset and pushes the second number switch K1 beside the second ROM card receiving unit 211. In this case, the CPU 43 outputs the enable signal EN1 to the second ROM X1, and the data stored in the second ROM X1 is inputted into the CPU 43 through the serial communication bus BUS1. The CPU 43 outputs a DTMF signal having a predetermined level to the DTMF terminal, and the DTMF signal is transferred to the telephone set through the transistor Q, the resistor R4, the ground, the diode D3 of the connection unit 41, the modular jack MDJ, and the line L12. As a result, the telephone set attempts a call with the switch unit.

In addition, The setting/completion switch KSEC is divided into short time pushing operation and a long time pushing time operation, so that it is possible to store two telephone numbers into one ROM. Therefore, the CPU 43 outputs divided enable signals to the ROMs X0 through X9 of the first memory unit 45. If the user pushes the setting/completion switch KSEC for a short time or long time, the CPU recognizes whether the setting/completion switch KSEC is pushed for a short time or a long time and outputs one enable signal between two enable signals. In the interior of the enabled ROM, the memory regions are divided and allocated. The user stores the telephone number into the selected ROM by sequentially pushing the telephone numbers in the same manner as the above-described method. Thereafter, the setting/completion switch KSEC is pushed. The user records two cases in which one case corresponds to when the telephone number is pushed for a long time, and the other case corresponds to when the telephone number is pushed for a long time, whereby the user can recognize a predetermined telephone number should be transmitted among two telephone numbers. Namely, when transmitting the telephone number, the user picks up the handset and pushes the number switch near the ROM card for a short time or a long time for thereby recognizing when the setting/completion switch is pushed for a short time or long time.

When completing the storing operation, the operation is divided into the case that the setting/completion is pushed for a short time and the case that the same is pushed for a long time for thereby updating the previously stored telephone number to another telephone number. After the telephone number storing operation is completed, in order to complete the telephone number storing operation, the setting/completion, switch is pushed. In this case, if the setting/completion switch KSEC is pushed for a short time, the CPU 43 recognizes the short time push and outputs an enable signal by which the data stored in the ROM is updated to another data. On the contrary, if the setting/completion switch KSEC is pushed for a long time, the CPU 43 outputs an enable signal by which the data store din the ROM is not updated to another data. Therefore, the user is capable of using a predetermined function if necessary.

A sticker may be used in order to the user to easily write down the telephone numbers on the ROM card. The user writes a telephone number of the sticker, and the sticker may be attached on the ROM card. When the manufacturer provides the users with the sticker, the user uses the sticker, and is capable of easily writing the telephone number on the ROM card.

Figure 6:
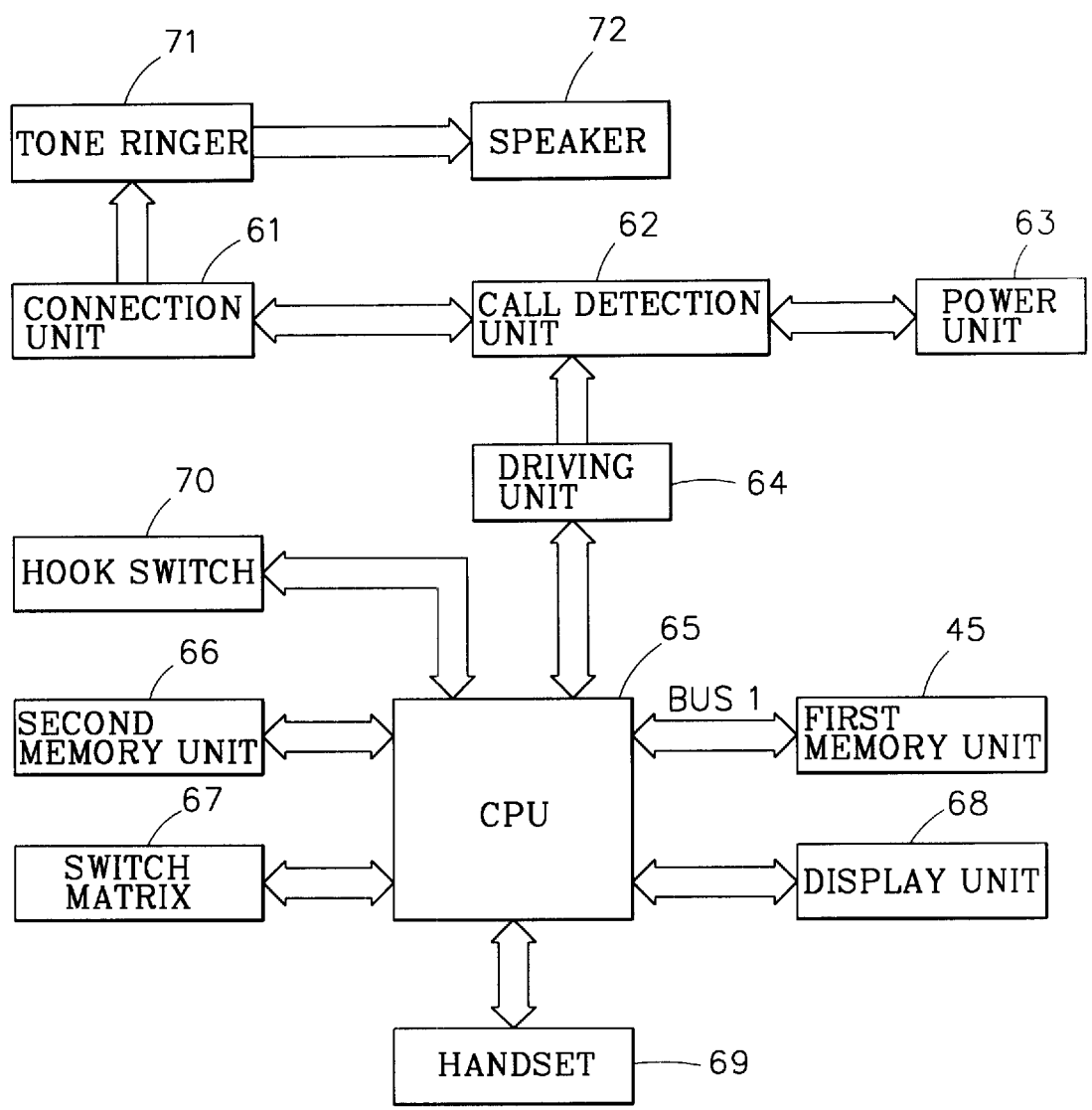
FIG. 6 is a block diagram illustrating a shortcut dialing apparatus for a telephone set according to a third embodiment of the present invention.

FIG. 6 is a block diagram illustrating a shortcut dialing apparatus according to a third embodiment of the present invention.

In the first and second embodiments of the present invention, the shortcut dialing apparatus and the telephone set are separated. In the third embodiment of the present invention, the shortcut dialing apparatus and the telephone set main body are integrally formed. The first memory unit 45 as shown in FIG. 6 is the same as the first memory unit 45 as shown in FIG. 4, and the power unit 61 generates a power for driving each element. The connection unit 61, the power unit 63, the CPU 65, the switch matrix 67, and the second memory unit 66, the DTMF driving unit 64, and the display unit 68 are given the same reference numerals as the embodiment shown in FIG. 4. Since the communication detection unit 62, the hook 70, the tone ringer 71, the speaker 72 and the handset 69 are the same as the conventional art, the description thereof is omitted.

As described above, the present invention may be used for a business company which controls a plurality of users. In the present invention, a predetermined telephone number is stored into a corresponding ROM card, and then the ROM card is inserted into a corresponding ROM card receiving unit, so that the telephone number stored in the ROM card is transmitted by pushing a corresponding switch at one time, whereby the user can easily use the shortcut dialing function. In addition, the user can handle the telephone number directly inputted by the user. In addition, in the side of the business company, a predetermined number is stored into the ROM card, and the telephone number is written on the sticker, and the sticker is attached on one side of the ROM card, and then the ROM card is distributed to the customers, so that the customer can easily communicate with the business company for thereby increasing the business performance of the company.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A shortcut dialing apparatus for a telephone set, comprising:
   a plurality of ROMs for storing telephone numbers therein;
   a plurality of ROM cards including a corresponding ROM among the ROMs and electrically and detachably being engaged with a main body;
   a ROM card receiving unit formed in the main body for receiving the ROM card therein;
   a plurality of selection switches for selectively outputting the telephone number stored in the ROMs;
   a CPU for scanning the selection switch pushed by a user among the selection switches and outputting data corresponding to the telephone number stored in the ROM;
   a DTMF signal generator for outputting a DTMF signal corresponding to the data; and
   a speaker for receiving the DTMF signal and outputting a sound.

2. The apparatus of claim 1, wherein said ROM card is thin for being slidably received, and said ROM card receiving unit includes a groove for receiving the ROM card therein.

3. The apparatus of claim 1, wherein a sticker on which the telephone number is written is attached on one surface of the ROM card for recognizing the telephone number stored in the ROM, and a predetermined character or symbol is written on the sticker.

4. The apparatus of claim 1, wherein said ROM card receiving unit includes contact pins for implementing an electrical connection with the ROM card, and said ROM card includes an input/output terminals for being electrically connected with the contact pins.

5. The apparatus of claim 1, wherein said selection switch is installed at a portion corresponding to a corresponding ROM card.

6. A shortcut dialing apparatus for a telephone set, comprising:
   a connection unit connected with a local line and a telephone set;
   a constant voltage generator for dividing a local line voltage through the connection unit and generating a power source;
   a plurality of ROMs for storing telephone numbers;
   a plurality of ROM cards including a ROM among the plurality of ROMs, said ROM cards being electrically and mechanically detachable from a main body;
   a ROM card receiving unit installed in the main body for receiving the ROM cards;
   a switch matrix including a plurality of switches for selectively outputting the telephone number stored in the ROMs;
   a CPU for scanning the switch pushed by the a user among the switches, receiving a data corresponding to the telephone number stored in the ROM and outputting a DTMF signal as a result of the received data; and
   a DTMF driving unit for transferring the DTMF signal to the connection unit.

7. The apparatus of claim 6, wherein the plurality of ROMs are connected with each other and the CPU by a serial communication bus for implementing a data transmitting and receiving operation.

8. The apparatus of claim 7, wherein said ROMs each includes:
   a first terminal for receiving an enable signal of the CPU;
   a second terminal connected with the ground; and
   third and fourth terminals connected with the serial communication bus,
   wherein said ROM card receiving unit includes contact pins for an electrical connection with the ROM card, and the contact pins are elastically connected with four terminals of the ROM.

9. The apparatus of claim 6, wherein said connection unit includes a modular jack connected with the local line, and a bridge diode for outputting the local line voltage to the constant voltage generator and for transferring the DTMF signal to the telephone set.

10. The apparatus of claim 6, wherein said constant voltage generator includes:
    first and second resistors for dividing the local line voltage; and
    a zener diode and condenser connected in parallel with the second resistor for generating the constant voltage.

11. The apparatus of claim 10, wherein said constant voltage generator includes a resistor and diode connected in parallel between a ground connected with the second resistor, the zener diode and the condenser and another ground.

12. The apparatus of claim 6, further comprising a second memory unit formed of a ROM in which a plurality of telephone numbers are stored,
    wherein said switch matrix includes a plurality of shortcut switches, and when the shortcut switch is pushed, the CPU outputs the DTMF signal corresponding to the telephone number stored in the ROM of the second memory.

13. The apparatus of claim 6, further comprising a display unit which includes a LED and emits light when the switch is pushed, and a buzz for generating a sound when the switch is pushed.

14. The apparatus of claim 6, wherein said switches includes a setting/completion switch for setting the system to the storing mode or the transmission mode, and a plurality of number switches, whereby the CPU stores the telephone number into the ROM when the setting/completion switch is pushed, a plurality of number switches are sequentially pushed, and the setting/completion switch is pushed again.

15. The apparatus of claim 14, wherein said CPU recognizes the cases that when the setting/completion switch is pushed for a short time or long time for thereby allocating the memory region of the ROM.

16. The apparatus of claim 14, wherein said CPU recognizes the cases that the setting/completion switch is pushed for a short time or long time when the setting/completion switch is pushed, for thereby the data previously stored in the ROM is updated to another data.

17. A shortcut dialing apparatus for a telephone set, comprising:
    a plurality of ROMs for storing telephone numbers;
    a plurality of ROM cards including a ROM among the plurality of the ROMs, said ROM cards being electrically and mechanically detachable from a main body;
    a ROM card receiving unit installed in the main body for receiving the ROM cards;
    a switch matrix including a plurality of switches for selectively outputting the telephone number stored in the ROMs; and a CPU for scanning the switch pushed among the plurality of switches by a user, receiving a data corresponding to the telephone number stored in the ROM and outputting a DTMF signal, whereby the above-described elements are installed in the telephone set main body.

18. The apparatus of claim 17, wherein the plurality of ROMs are connected with each other and the CPU by a serial communication bus for implementing a data transmitting and receiving operation.

19. The apparatus of claim 18, wherein said ROMs each include:

a first terminal for receiving an enable signal of the CPU;

a second terminal connected with the ground; and third and fourth terminals connected with the serial communication bus, wherein said ROM card receiving unit includes contact pins electrically connected with the ROM card, and the contact pins are electrically connected with four terminals of the ROM.

20. The apparatus of claim 17, wherein said switches includes a setting/completion switch for setting the system to the storing mode or the transmission mode, and a plurality of number switches, whereby the CPU stores the telephone number into the ROM when the setting/completion switch is pushed, a plurality of number switches are sequentially pushed, and the setting/completion switch is pushed again.

21. The apparatus of claim 20, wherein said CPU recognizes the cases that when the setting/completion switch is pushed for a short time or long time for thereby allocating the memory region of the ROM.

22. The apparatus of claim 20, wherein said CPU recognizes the cases that the setting/completion switch is pushed for a short time or long time when the setting/completion switch is pushed, for thereby the data previously stored in the ROM is updated to another data.

* * * * *